Aug. 16, 1932.  F. D. KINNEY  1,871,890
METHOD OF MAKING RUBBER SHOES
Filed Sept. 29, 1928   8 Sheets-Sheet 1
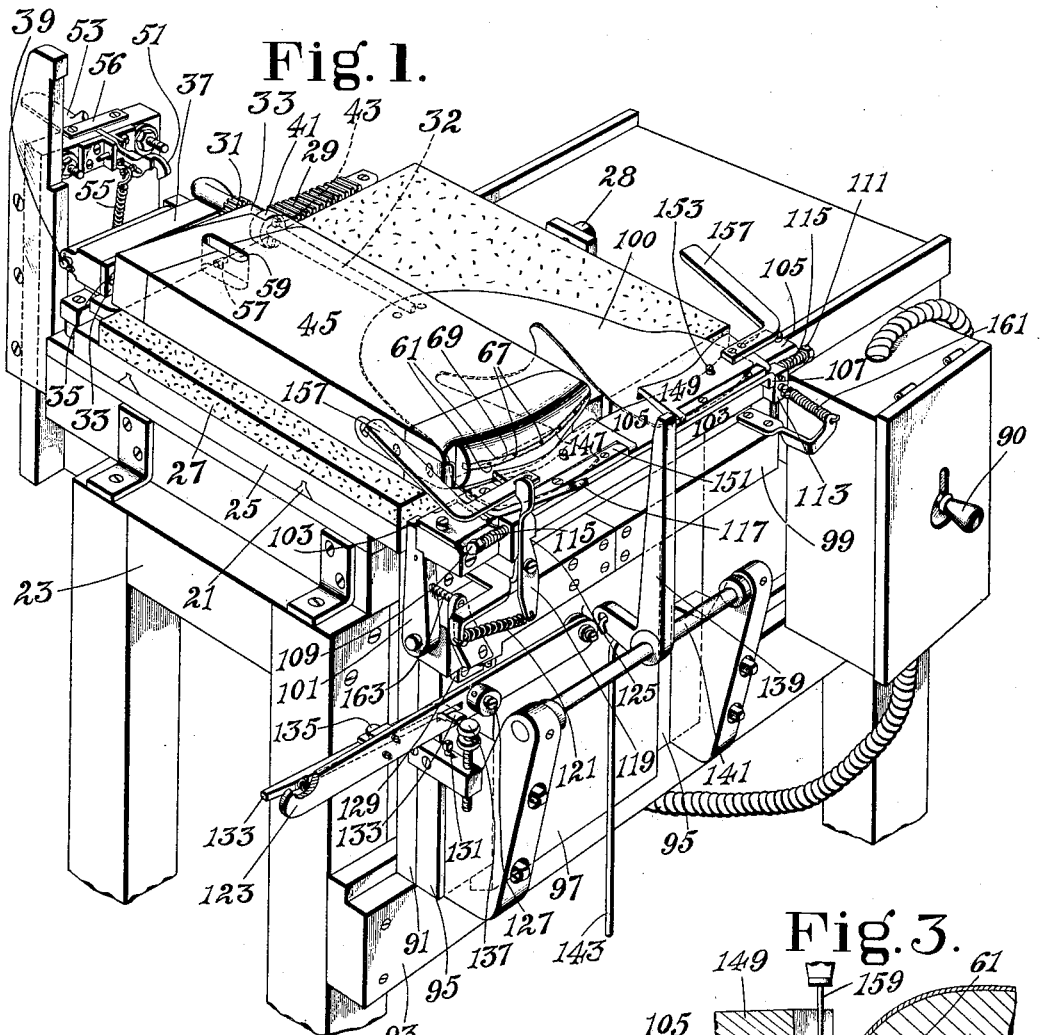
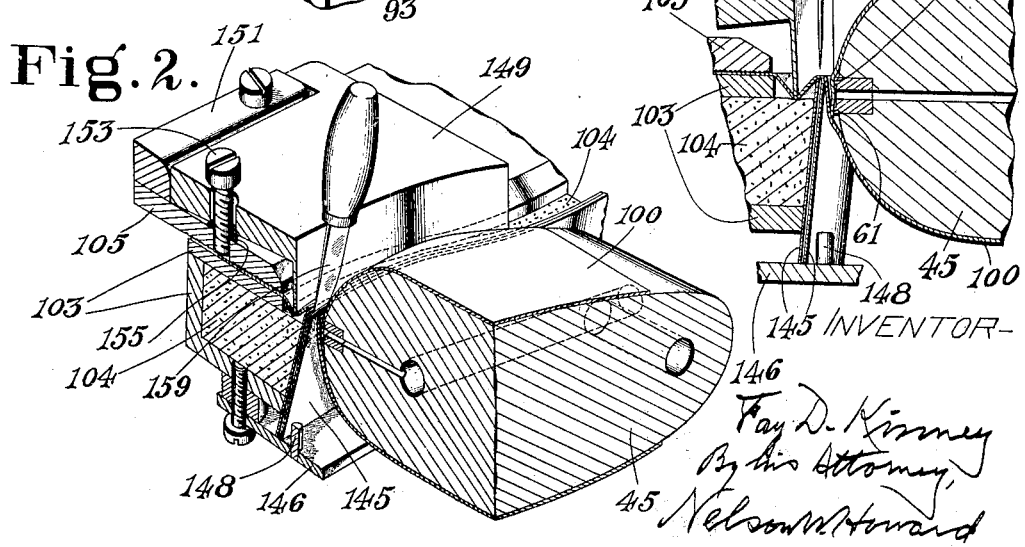

Aug. 16, 1932.   F. D. KINNEY   1,871,890
METHOD OF MAKING RUBBER SHOES
Filed Sept. 29, 1928   8 Sheets-Sheet 2

INVENTOR-
Fay D. Kinney
By his Attorney,
Nelson W. Howard

Aug. 16, 1932.  F. D. KINNEY  1,871,890
METHOD OF MAKING RUBBER SHOES
Filed Sept. 29, 1928  8 Sheets-Sheet 4
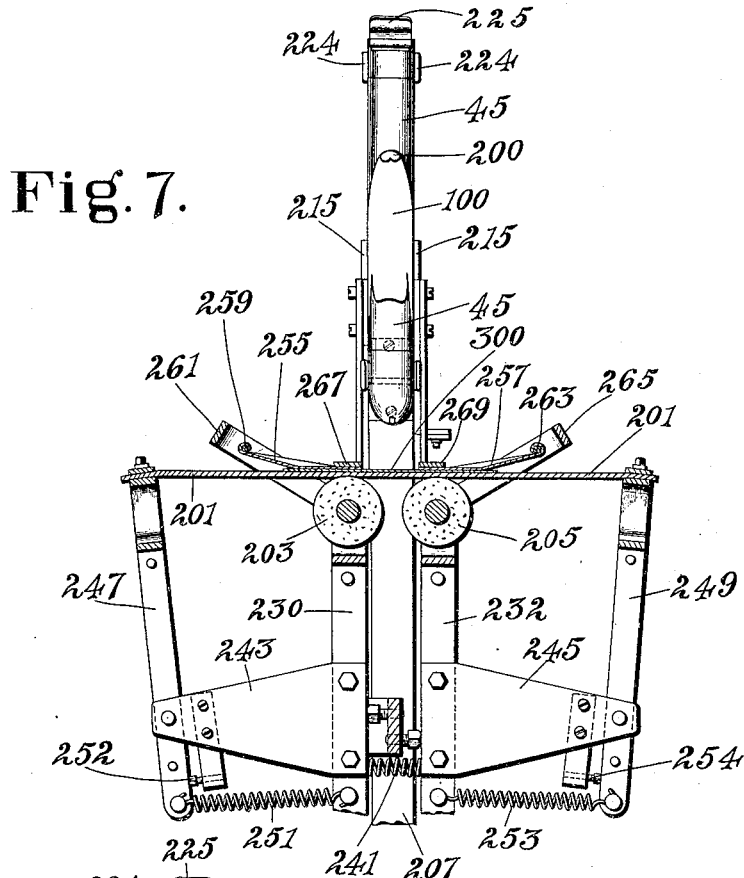
Fig. 7.
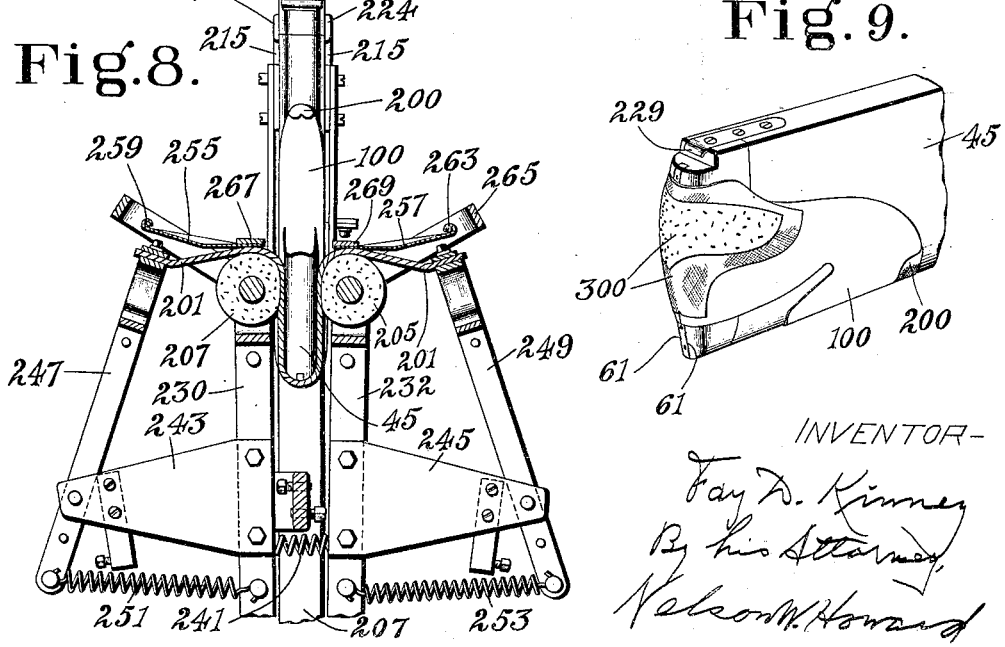
Fig. 8.
Fig. 9.
INVENTOR-
Fay D. Kinney
By his Attorney,
Nelson W. Howard Aug. 16, 1932.  F. D. KINNEY  1,871,890
METHOD OF MAKING RUBBER SHOES
Filed Sept. 29, 1928    8 Sheets-Sheet 5
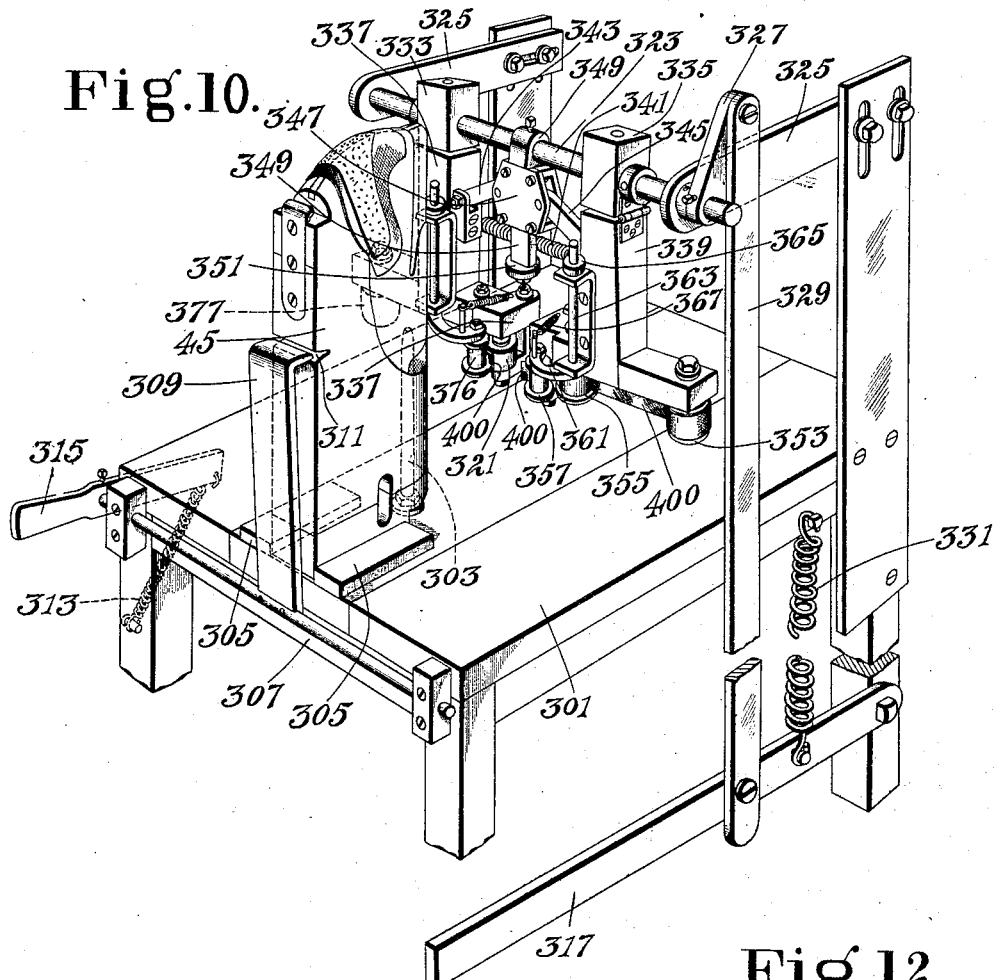
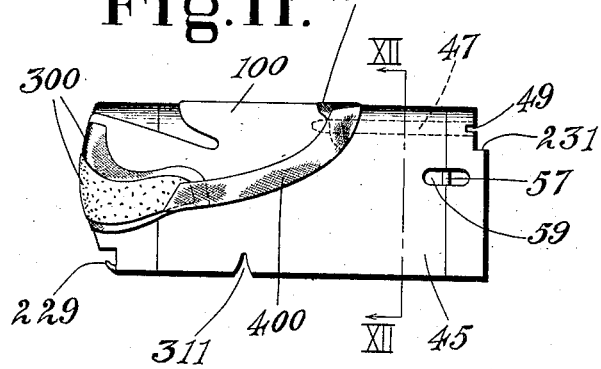
INVENTOR-
Fay D. Kinney
By his Attorney,
Nelson W. Howard Aug. 16, 1932.                F. D. KINNEY                1,871,890
                       METHOD OF MAKING RUBBER SHOES
                  Filed Sept. 29, 1928      8 Sheets-Sheet 6

INVENTOR—
Fay D. Kinney
By his Attorney
Nelson W. Howard

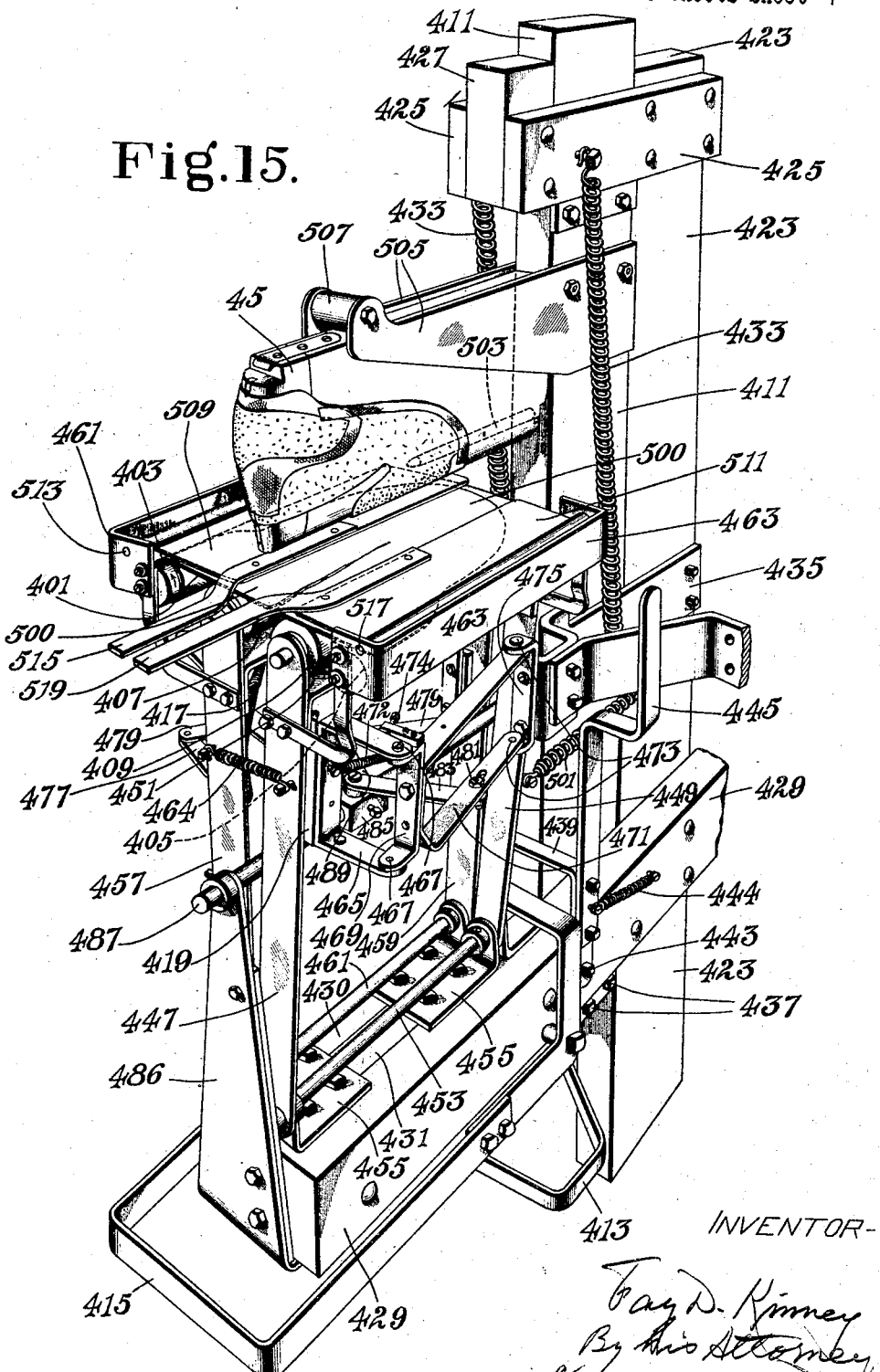

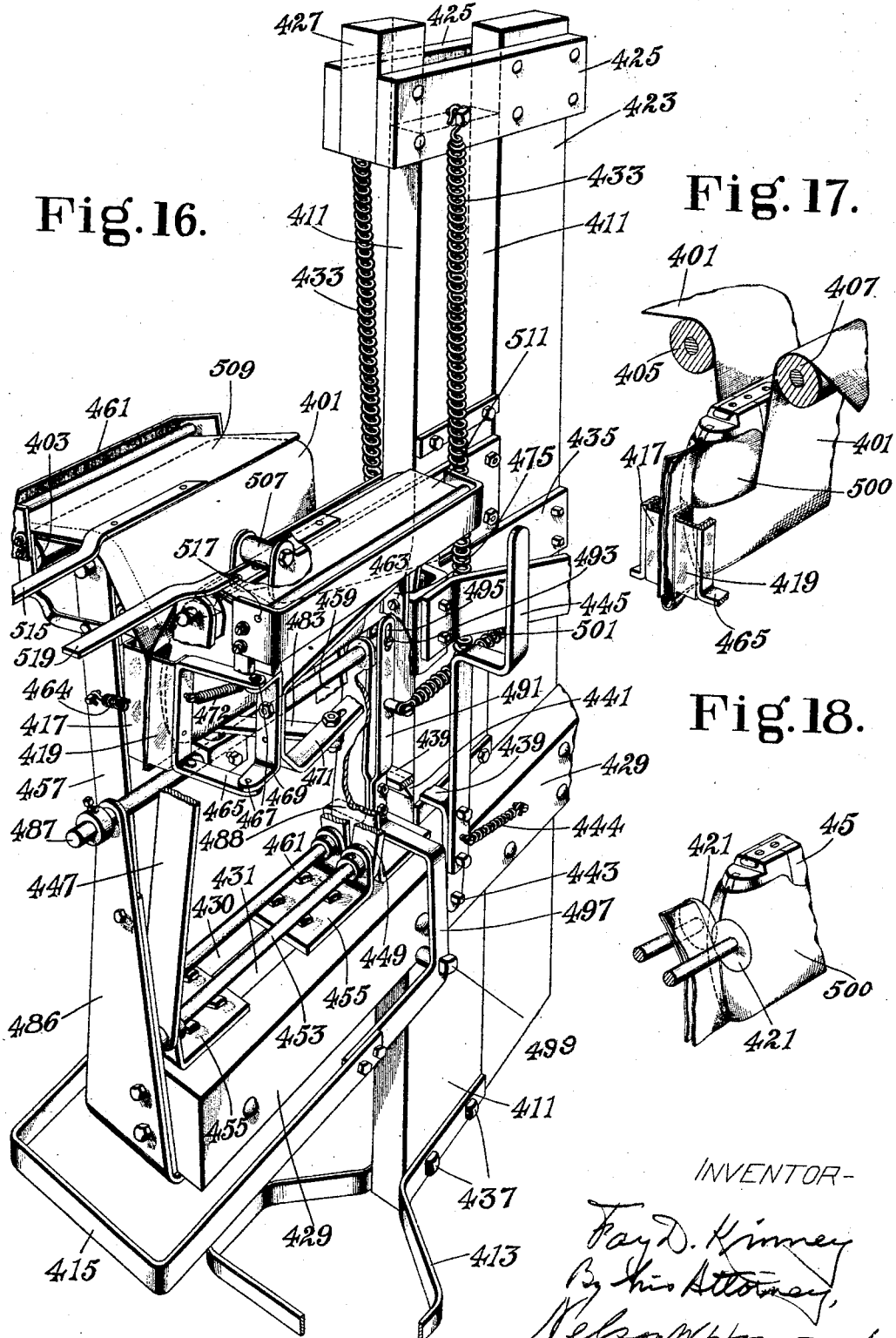

Patented Aug. 16, 1932

1,871,890

UNITED STATES PATENT OFFICE

FAY D. KINNEY, OF WENHAM, MASSACHUSETTS, ASSIGNOR TO UNITED SHOE MACHINERY CORPORATION, OF PATERSON, NEW JERSEY, A CORPORATION OF NEW JERSEY

METHOD OF MAKING RUBBER SHOES

Application filed September 29, 1928. Serial No. 309,181.

This invention relates to methods of manufacturing footwear and is particularly adapted for use in the manufacture of rubber footwear some or all of the parts of the uppers of which, in their original state, contain or are made of unvulcanized rubber and require to be vulcanized after they have been assembled. Such rubber footwear will be referred to as rubber shoes, and the invention will be explained as applied to the manufacture of rubber overshoes.

In the manufacture of a rubber overshoe, it is generally customary to assemble the various parts of the upper upon a last by mounting the lining upon the last and superposing the remaining parts upon the lining and upon one another. After the upper has been thus assembled, the insole and the outsole are placed upon the bottom of the last, and the shoe is subjected to vulcanization. The vamp of a rubber overshoe is commonly made of unvulcanized rubber and the remaining portions of fabric frictioned on one or both sides so that the parts readily adhere to one another. It is necessary, however, that these parts should be smoothly laid and that no air should be entrapped between any of the parts, since otherwise blisters result from the vulcanizing operation. Hitherto, it has been the general practice to build the shoe upon the last by placing the parts one by one by hand and pressing each part into place by means of a hand roller. Another practice, which has found some favor, is to superpose the parts of the upper by hand upon one another in the flat, then to subject them to pressure while flat and thereafter to mount the assembled upper upon a last. From this stage to the completion of the shoe, this second-named practice is substantially the same as the one first described.

A general object of the present invention is to do away to a large extent with the manual placing of the parts of the upper and to speed up the assembling and pressing of these parts.

According to the present invention the parts of an upper are mounted upon a form the surfaces of the sides of which are cylindrical, for example, substantially flat. They are then preferably subjected to pressure applied simultaneously on both sides of the form, after which the assembled parts are removed from the form, placed upon a last, and the manufacture of the shoe is completed.

In the illustrated apparatus by the use of which the method may be conveniently practiced by assembling the parts in succession upon a form, there is provided a form, having a plurality of fastening means, and a series of machines for mounting in succession parts of the upper of a rubber shoe upon the form, each machine having means for engaging the appropriate fastening means on the form so as to hold the form in the different positions required in the several machines for the successive operations. In the illustrated apparatus, the form is first fastened in place in and becomes part of a machine which operates to mount the vamp upon it. Next the form, with the vamp upon it, is removed from the vamp mounting machine and fastened in place in a machine for mounting the counter; and subsequently, by similar procedures with two more machines, a tape reinforcement and finally a lining are mounted, so that there results a completely assembled upper all of the parts of which have been rapidly mounted in proper position upon the form and pressed into firm contact. The assembled upper is then removed from the form and placed upon a last. Thereafter, the insole and outsole are added, and the shoe is vulcanized. By providing a form and a series of machines as outlined above, the manual placing or mounting of the parts of the upper upon the last and upon one another is dispensed with, and the assembling of these parts is accomplished in much less time than was formerly required.

Referring now to the accompanying drawings,

Fig. 1 is a perspective of a vamp mounting machine;

Fig. 2 is a perspective, partly in section, showing more particularly the mechanism of this machine for holding the rear end of the vamp while it is being trimmed;

Fig. 3 is a section of the parts which are shown in Fig. 2;

Fig. 7 is a vertical transverse section of this machine with the parts in the same positions as in Fig. 6;

Fig. 8 is a section like Fig. 7 but showing the counter in process of being mounted upon the form;

Fig. 9 is a perspective of a portion of the form, with the vamp, the toe-piece and the counter mounted upon it;

Fig. 10 is a perspective of the tape mounting machine with the parts in their normal position of rest;

Fig. 11 is a side elevation of the form with the vamp, the toe-piece, the counter and the tape reinforcement mounted upon it;

Fig. 12 is a transverse section of the form;

Fig. 15 is a perspective of the lining mounting machine with the parts in their normal position of rest;

Fig. 16 is a perspective of the same machine showing the lining in process of being mounted upon the form;

Fig. 17 is a perspective showing the operation of the wipers of this machine; and Fig. 18 is a perspective of a portion of a machine which may be used to trim the lining.

Figure 4:
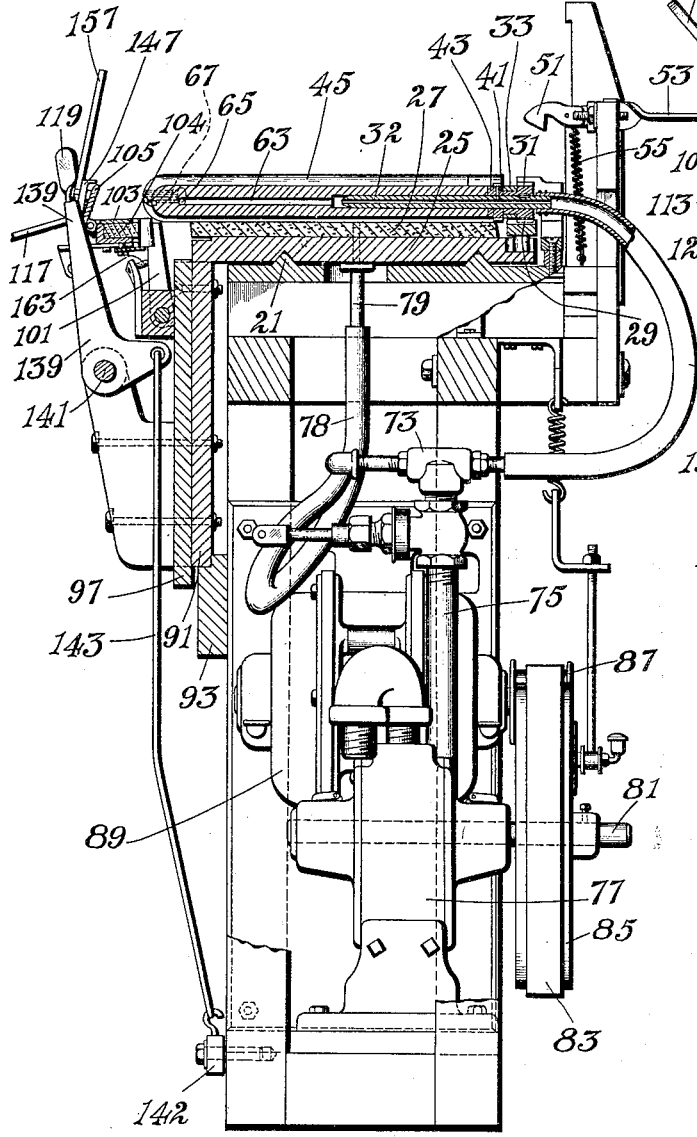
Fig. 4 is a vertical longitudinal section of the vamp mounting machine with the clamp in raised, inoperative position.
Figure 5:
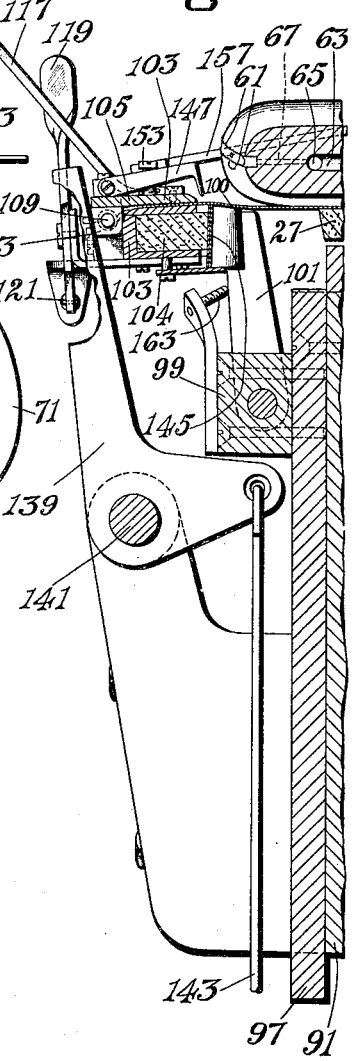
Fig. 5 is a vertical longitudinal section of a portion of the same machine but with the clamp in lowered operative position.
Figure 6:
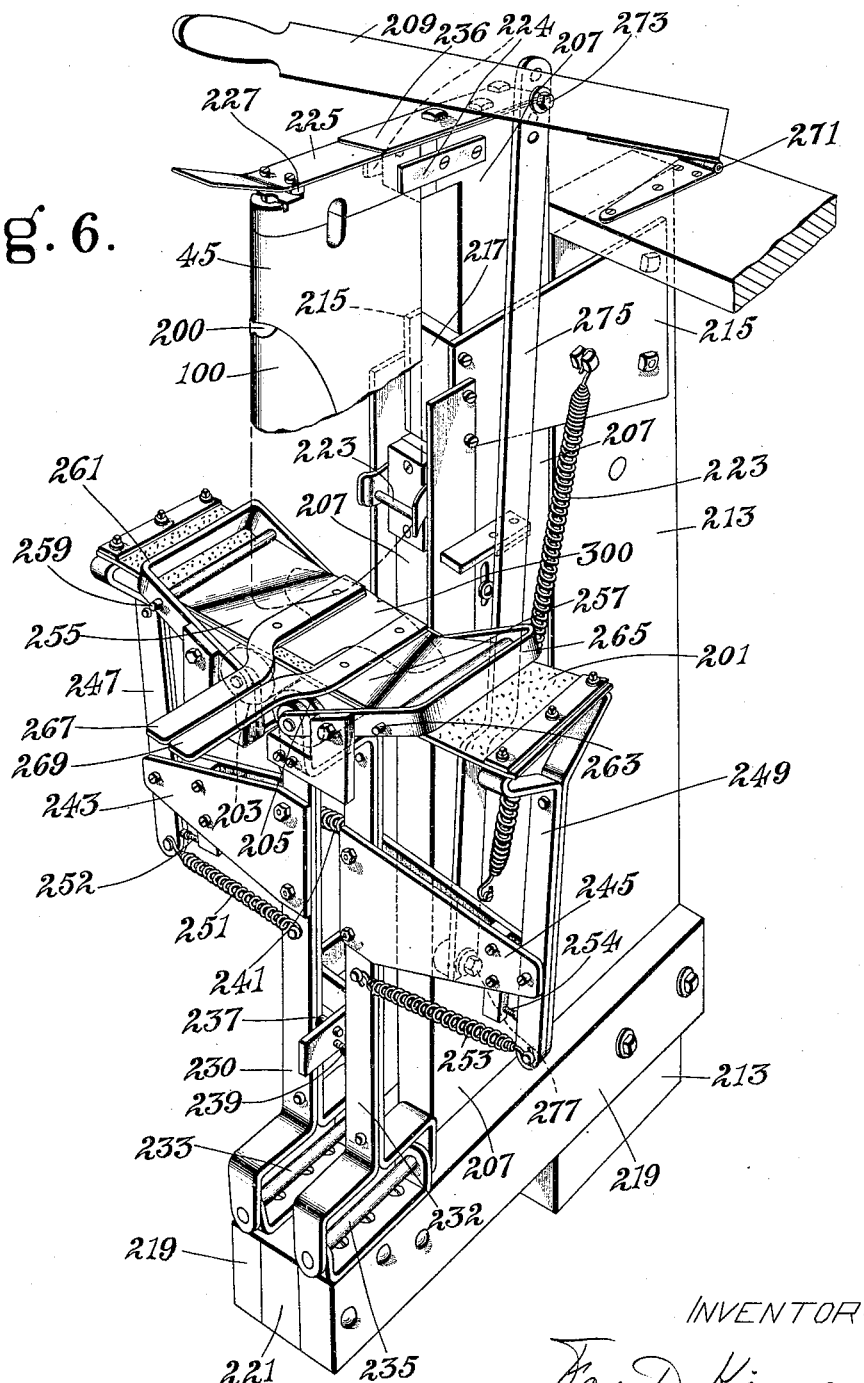
Fig. 6 is a perspective of the counter mounting machine with the parts in their normal position of rest.

Before proceeding to a detailed description of the machines by the use of which certain steps of the method may be practised, a brief description of the machines and the steps of the method will be given. The upper of the rubber shoe, except the lining, and including a rubber vamp, a toe cap, a counter, and a tape reinforcement, is shown in Fig. 11 assembled wrong side out upon a form 45. The illustrated shoe is a so-called "storm rubber" overshoe. The vamp is indicated at 100, the rear ends of the legs of said vamp being overlapped at the rear end of the form. The rubber toe-piece 200 covers the forward end of the vamp. The counter 300 is a composite one, consisting of two pieces one of which is commonly of friction fabric and the other of rag stock, and covers the rear end of the vamp. The tape reinforcement 400 consists of two pieces of friction fabric (only one being visible in Fig. 11), which are laid along the lower margin of the vamp. These pieces at their rear ends overlap the counter and at their forward ends extend over the toe cap. The lining, not shown since it would obscure the other parts in Fig. 11, covers all of said other parts. The vamp, the counter, the tape reinforcement, and the lining are mounted upon the form in the order named preferably by the use of four machines termed, respectively, the vamp mounting machine, the counter mounting machine, the tape mounting machine, and the lining mounting machine. The toe-piece is preferably mounted by hand. After the parts of the upper have been assembled, the upper is removed from the form and turned right side out. Thereafter the upper is coated with cement along its lower margin, assembled with an insole upon a last, and the manufacture of the shoe completed by adding the remaining parts, including the outer sole, and subjecting the shoe to vulcanization.

By assembling the upper wrong side out, use is made of the fact that the unvulcanized rubber vamp, which is mounted first, will stick to the form sufficiently to retain its position and at the same time may be readily stripped from the form when it is desired to remove the assembled upper. Moreover, the vamp, which is comparatively soft and somewhat sticky, is protected by the parts which are superposed upon it as long as it remains upon the form; and a number of forms with uppers mounted upon them may be piled one upon another or placed in receptacles, if desired, for transportation to a different part of the factory, without danger of sticking together.

The form shown in Figs. 11 and 12 is of generally rectangular outline, the rear end being rounded and curved to correspond substantially to the heightwise curvature desired at the rear end of the finished shoe. The upper edge, as viewed in the two figures, is also rounded; and the form is provided with a plurality of fastening means including certain sockets, keyways, pins, hooks and notches to permit it to be engaged and properly held in different positions in the four machines which have been referred to above. In the operations of the machines, the various parts of the upper are subjected to pressure by means of rollers; and it is desirable that these rollers should press the parts firmly at all points against the form, or against the parts upon which they are superposed. A form, the surfaces of the sides of which are approximately flat, will permit such rolling pressure to be applied effectively; and such a form is shown in Figs. 11 and 12. Although the two surfaces of the sides of the illustrated form are approximately flat, it should be understood that in general other cylindrical surfaces are suitable, a cylindrical surface being one generated by a right line which moves parallel to a fixed right line. The surfaces of the sides of the form may thus be somewhat concave, convex or broken if desired. It should also be noted that the rear end of the form need not be rounded nor curved to correspond to the heightwise curvature at the heel end of the shoe provided that it is so proportioned that it has the proper dimensions.

The vamp mounting machine

This machine is shown in Figs. 1 to 5 inclusive. In the operation of the machine, the vamp 100 is placed upon a flat support in the form of a rubber pad 27. The form 45 is brought down into the position shown in Fig. 1 in which it rests upon a longitudinal half of the vamp with the terminal portion of one leg of the vamp projecting beyond the rear end of the form. This terminal portion of one leg is wrapped around the rear end of the form and trimmed. The form is then rotated 180 degrees so as to wrap about the form the remaining portion of the vamp except the terminal portion of the other leg. When this has been done, this terminal portion is wrapped about the rear end of the form and its edge trimmed. The form, with the vamp mounted upon it, is then removed from the machine preparatory to being placed in the counter mounting machine. This brief description of the operation of the machine having been given, a detailed description will now follow:

Slidably mounted on ways 21, which are rigid with the frame 23 of the machine, is a table 25 provided with the rubber pad 27 upon which the vamp is placed. The table, which together with the rubber pad forms the vamp support, normally occupies the position shown with its edge against an adjustable stop screw 28; and the rubber pad has upon it certain marks (not shown) to guide the operator in placing the vamp upon it. The vamp thus occupies a predetermined position with respect to the parts of the machine. The table 25 has fast to one end a rack 29 with which meshes a pinion 31. This pinion is fast upon a tube 32 which is carried by the right-hand end (Fig. 1) of an arm 33, the left-hand end of this arm being pivoted at 35 to a block 37 which in turn is pivoted about a horizontal rod 39 carried by the frame of the machine. A pin (not shown), mounted in the arm 33, extends into a slot (not shown) in the block 37 and limits the extent of movement of the arm about its pivot 35. The pinion 31 has integral with it a sleeve which passes through the arm 33 and fast to the tube 32 is a collar 41 having a key 43 projecting from one face thereof. The form 45 (see Fig. 11) has a cylindrical socket 47 to receive the tube 32 and has also a keyway 49 to receive the key 43. With this construction the form may be rotated from vertical to the horizontal position shown about the pivot 39 and may then be rotated 180 degrees about the axis of the tube 32.

In order to permit the form to be held in vertical position while the rubber vamp 100 is being placed upon the work support, a latch 51 having a handle 53 is pivoted to a stationary bracket and urged downwardly at all times by a spring 55, the extent of this downward movement being limited by engagement of the handle 53 with a stationary bar 56. When the form is placed upon the tube 32 and swung up into vertical position, the latch 51 engages a pin 57, best shown in Fig. 11, which extends across a slot 59 in the form and holds the form upright. While the form is thus held up out of the way a vamp 100 is placed upon the rubber pad 27. The form is then swung down into the position shown in Fig. 1, in which one of its sides rests upon substantially a longitudinal half of the vamp; and inasmuch as the vamp is made of unvulcanized rubber, it adheres to the form. The terminal portion of the left-hand leg of the vamp, as viewed in Fig. 1, is then drawn about the rear end of the form, pressed against said rear end and trimmed, if necessary, by mechanism presently to be described. The operator then grasps the form and rotates it 180 degrees about the axis of the tube 32 so as to wrap the right-hand portion of the vamp about the form, leaving the terminal portion of the right-hand leg of the vamp projecting beyond the rear end of the form. As this rotation takes place, the pinion 31 is rotated; and, since this pinion is held from movement of translation except for a slight swinging movement about the pivot 35 of the arm 33, the rack 29 and the work support are moved to the left. The rotation of the form combined with the movement of the work support insures that the right-hand portion of the vamp shall be wrapped smoothly about the form without unduly stretching the vamp. Finally, the terminal portion of the right-hand leg of the vamp is drawn about the rear end of the form, pressed against said form and trimmed.

The mechanism for drawing the terminal portions of the legs of the vamp about the rear end of the form and for pressing them against the form is fast to the table 25 and moves with the table when the table slides. Before describing this mechanism and its mode of operation, it should be explained that the rear end of the form is provided with two spaced rows of teeth 61 for the purpose of indenting the ends of the legs of the vamp, and that the left-hand leg of the vamp, which is first drawn about the rear end of the form, is held in place by suction during the rotation of the form. This suction is applied to the tube 32, the left-hand end of which (Fig. 4) is in communication through ports 63, 65 and a plurality of small ports 67 with a narrow channel 69 (Fig. 1) located between the rows of indenting teeth 61. The right-hand end of the tube 32 (Fig. 4) is connected with the upper end of a suction hose 71, the lower end being connected to a T-coupling 73, which in turn is connected with the intake pipe 75 of a pump 77. The coupling 73 is also connected by a second hose 78 with a pipe 79 which extends up through the work support so as to hold the vamp when it is first placed upon the work support. The pump shaft 81 is driven by a belt 83 and a large pulley 85 from a small pulley 87 on the shaft of an electric motor 89. This motor is controlled by a handle 90 (Fig. 1) of a switch; and the current is turned on before the vamp is laid on the work support. The suction thus holds the middle portion of the vamp upon the work support and holds the end of the left-hand leg of the vamp against the rear end of the form during the rotation of the form.

Returning now to the mechanism for drawing the terminal portions of the legs of the vamp about the rear end of the form, this mechanism is carried by a vertical plate 91, the upper end of which is fast to the horizontal work table 25 and the lower end of which rests upon a horizontal guide 93. Fast to this carrier plate 91 are two spaced, upright guides 95 having their opposed vertical edges undercut; and mounted between them is a vertical slide 97, fast to the upper portion of which is a heavy bar 99. Pivoted to opposite ends of this bar are two arms 101; and fast at its ends to the upper ends of these arms is a bar 103, the upper surface of which is substantially flush with the surface of the rubber pad 27 of the vamp support. This bar is made in three pieces (Figs. 2, 3 and 5), namely, a flat upper plate, an angular lower plate, and a rubber core 104 held clamped between the plates and extending considerably beyond and to the right (Figs. 4 and 5) of the upper and lower plates. It is through this rubber core that the ends of the legs of the vamp are pressed against the rear end of the form.

When the vamp is placed upon the work support, the terminal portions of its legs rest upon the bar 103, and these terminal portions are first clamped upon the bar. To this end, there is provided a clamp 105 in the form of a long narrow plate having downwardly projecting small ears 107, one of which is shown in Fig. 1. These ears are pivoted respectively upon the ends of headed studs 109, 111, said studs being carried by blocks 113 which are fast to the bar 103. Torsion springs 115 fastened at one of their ends to the clamping plate 105, and at the other to the heads of the studs tend, at all times to hold the clamping plate down in position to clamp the terminal portions of the legs of the vamp upon the bar 103. This is the position shown in Figs. 1 and 5. The clamping plate 105 may be swung up and held in that position by pushing down a handle 117, one end of which is fast down to the clamping plate 105, and permitting it to engage a notch 125 in a latch 119, which is pivoted to a bracket on the bar 103 and is held against the side of the handle 117 by a tension spring 121. The clamping plate 105 is held in this raised position while the vamp is being placed upon the work support with the terminal portions of its legs resting upon the bar 103, after which the latch 119 is swung to disengage the handle 117 and thereby to permit the clamp to descend to the position shown in Figs. 1 and 5, so as to clamp the terminal portions of the legs of the vamp upon the bar 103. This bar 103 has in its forward edge two curved faces which correspond roughly, one of them to the curve presented by the rear end of the form 45 when said form is in the position shown in Fig. 1, and the other to the same curve when the form has been rotated 180 degrees about the axis of the tube 32.

The next step in the operation of the machine is to raise the bar 103 so as to pull the terminal portion of the left-hand leg of the vamp, as viewed in Fig. 1, about the rear end of the form. To accomplish this, the slide 97 is moved upwardly by depressing the outer end of a hand lever 123 which is pivoted at its inner end to the slide and near its middle at 127 to one of the stationary guides 95. The slide is normally supported in the position shown in Fig. 1 by a stop screw (not shown) carried by a bracket 129 also fast to the guide 95. The lever 123, when pushed down, contacts with a stop screw 131 and is adapted to be held down by a spring-pressed latch 133 pivoted to the lever 123 about a vertical pivot 135 and having one end curved and projecting through a slot in the lever, said curved end being adapted, when the outer end of the lever has been pushed down, to engage underneath the head of a screw 137. The outer ends of the lever and of the latch are grasped in order to release the latch, and then the outer end of the lever is depressed in order to raise the slide 97 and with it the bar 103 so as to pull the terminal portion of the left-hand leg of the vamp about the rear end of the form 45.

The next step is to swing the bar 103, with its rubber core 104, toward the rear end of the form 45 so as to press the terminal portion of the left-hand leg of the vamp against the rear of the form. In order to permit the bar 103 to be swung toward the form, a bell crank lever 139, pivoted on a rod 141 carried by brackets mounted upon the guides 95, engages the rear edge of the clamping plate 105 with its upright arm and has pivoted to its horizontal arm a treadle rod 143 which is attached to a lever 142 (Fig. 4) having a treadle (not shown) at one end thereof. The clamping plate 105, it should be remembered, is pivoted to the bar 103 about the studs 109, 111 so that when the treadle is depressed and the bell crank lever 139 pushes against the rear edge of the plate 105, said lever acts to swing the bar 103 about the pivots of the arms 101 and causes the rubber core 104 to press the end of the left-hand leg of the vamp against the rear end of the form. As will presently be explained, there is interposed between the forward edge of the rubber core 104 and the rear edge of the form 45, a pair of thin spaced plates so that the rubber core does not actually contact with the vamp. The position of the bar 103 at this time is such that the end of the left-hand leg of the vamp is pressed against the rear end of the form to a level above that of the upper of the two rows of teeth 61, as they are shown in Fig. 1, and the vamp is thereby impressed with two rows of indentations.

At this point, the surplus rubber which extends above the upper row of teeth is trimmed off. To this end the forward edge of the bar 103 carries two thin slightly spaced spring plates 145 (Figs. 2 and 3); and the clamping plate 105 has pivoted upon it two hold-downs 147, 149, one for use in the position which the form 45 occupies in Fig. 1 and the other for use in the position which the form occupies when it has been rotated through 180 degrees. The hold-downs are hinged to elongated blocks 151 which are fast to the plate 105. Screws 153 (Fig. 2) pass loosely through holes in the hold-downs and are threaded into the plate. Compression springs 155 normally urge the hold-downs up into contact with the heads of the screws. The hold-downs have handles 157 by which they may be depressed into the position shown in Figs. 2 and 3 when it is desired to trim off the surplus rubber. Figs. 2 and 3 show the trimming of the right-hand leg of the vamp, viewing said vamp as shown in Fig. 1; but the trimming operation is substantially the same for the left-hand leg. The trimming is done by means of a knife 159 which is thrust by the operator between the thin plates 145 and run along between them, the purpose of the hold-downs being to draw the surplus rubber tight over the edges of the thin plates. These plates rest upon a plate 146 (Figs. 2 and 3) which is rigidly attached to the bar 103 and is spaced somewhat from the under side thereof. The thin plates 145 are curved to correspond to a curvature of the front or operative edge of the bar 103 and its rubber core 104, being held in such curved shape by engagement with suitably disposed pins 148 in the supporting plate 146. The form 45 is still in the position shown in Fig. 1; the slide 97 is in raised position; the bar 103 has been swung forward; the hold-down 147 is in lowered position and the end of the left-hand leg of the vamp has been trimmed. The hold-down 147 is now released; the treadle is released, whereupon a tension spring 161 swings the bar 103 away from the form 45 as far as a stop screw 163 will permit; the lever 123 is manipulated to lower the slide 97, and the handle 117 is pushed down until it is caught by the latch 119 so that the clamping plate 105 is in raised position.

The operator now seizes the form and rotates it 180 degrees, at the same time pressing the rounded edge of the form (the right-hand edge as viewed in Fig. 1) against the vamp. During this rotation, the pinion 31 is rotated and through its action upon the rack 29, slides the work support to the left upon its ways 21. The right-hand portion of the vamp is thus wrapped smoothly about the form 45 which then rests upon said right-hand portion. The clamping plate 105 is released and comes down upon the terminal portion of the right-hand leg of the vamp. The operations upon the right-hand leg of the vamp are now carried out exactly as the similar operations were carried out upon the left-hand leg, it being remembered that the suction is still holding the left-hand leg against the form. Briefly, then the lever 123 is manipulated to raise the slide 97 and with it the bar 103 and the clamping plate 105; the treadle is depressed to press the terminal portion of the leg of the vamp against the rear end of the form 45; the hold-down 149 is moved into the position shown in Figs. 2 and 3, and the knife 159 is run along in the space between the thin plates 145 to trim off the surplus rubber. The parts of the machine are then returned to normal position ready to receive another vamp and another form. By the procedure which has been described above, the unvulcanized rubber vamp is wrapped smoothly about the form and occupies the position shown in Fig. 11. The rear ends of the vamp have been overlapped and the overlapping portions have been indented—or in factory parlance "stitched"—by the action of the two rows of teeth 61 which extend from top to bottom of the rear end of the form. The form with the vamp mounted upon it is removed from the machine and the toe piece 200 is mounted by hand.

*The counter mounting machine*

Referring to Figs. 6, 7, 8 and 9, which show the counter mounting machine, the operation of this machine is briefly as follows: The counter 300 is placed upon a supporting strap 201, of rubber or rubberized fabric, which extends horizontally over two rubber-covered presser rolls 203, 205. The form 45, with the vamp 100 and toe piece 200 upon it, is mounted upon a carrier in the form of a vertical slide 207; and then a hand lever 209 is manipulated to move the slide downward so as to push the form, rear end down, between the rolls 203, 205, as shown in Fig. 8 and thereby to wrap the counter about the rear end of the vamp and press it firmly into place.

The rear vertical face of the slide 207 at its upper end is held against the front vertical face of a stationary upright 213 by two straps 215 and a cross piece 217; and the lower end of the slide is similarly held by two bars 219 and a cross piece 221. Tension springs, one of which is shown at 223, attached at their lower ends to the slide and at their upper ends respectively to the straps 215, normally hold the slide in a raised position determined by contact of a shoulder formed upon the slide with the lower edge of the cross piece 217.

In order to hold the form 45 firmly in place upon the slide 207, but in such manner that it may readily be detached, said slide carries three separate means for engaging the form, namely, a cross pin 223 which is spaced in front of its front edge, a pair of flat guides 224 near its top, and a latch made of a thin strip of spring steel 225 having near its outer end on its under face a cleat 227. Referring now to Fig. 11, the form 45 is provided with a hook 229 and with a shoulder 231. In order to mount the form on the slide 207, the hook 229 on the form is engaged with the cross pin 223 on the slide, and then the upper end of the form is pushed in until its upper rear portion lies between the guides 224, and the shoulder 231 is engaged by the cleat 227. The leaf spring 225 has overlying its rear portion a stiff steel plate 236 which is securely fastened to the top of the slide 207 so as to take the upward thrust of the form when the machine is operated. The form is thus firmly held upon the slide or carrier with its long flat edge against the flat front edge of the slide and its rear curved end presented downwardly.

The presser rolls 203, 205 are rotatably mounted in yokes which are rigid with the upper ends of upright arms 230, 232, said arms at their lower ends having other yokes which are pivoted respectively at 233 and 235 to brackets on the stationary bars 219. The arms 230, 232 are normally held against stationary but adjustable stop screws 237, 239, respectively, by a tension spring 241, the ends of which are fastened one to each arm. The arms carry respectively brackets 243, 245 to the outer ends of which are respectively pivoted levers 247, 249; and to the upper ends of these levers the ends of the counter supporting strap 201 are fastened. Tension springs 251, 253 urge the upper end of the levers apart about their pivots to an extent determined by adjustable stop screws 252, 254 and thus maintain the strap 201 taut while permitting it to be bent.

As has been explained above, the counter 300 is placed upon the strap and then the form is moved down into the position shown in Fig. 8, during which movement it first engages the middle portion of the counter and then pushes the counter, and with it the strap, between the presser rolls. In order to prevent the formation of wrinkles in the counter, as well as to insure that the counter shall not become displaced, two retarders or smoothers 255, 257 in the form of presser plates are provided. The smoother 255 is pivoted about a small rod 259 which is carried by a U-shaped bracket 261, said bracket being fast to the upper end of the arm 230. The smoother 257 is pivoted about a small rod 263 which is carried by a U-shaped bracket, said bracket being fast to the upper end of the arm 232. The smoothers are provided respectively with handles 267, 269 by which they may be swung out of the way preparatory to placing a counter upon the strap 201. After the counter has been so placed, the smoothers are swung back into the position shown in which the operator may press upon the handles, if he so desires, in order to control the amount of pressure applied to the counter. In order to provide means for moving the carrier slide 207 down when desired, the hand lever 209 is hinged at 271 to the frame of the machine and is pivoted near its middle at 273 to the upper end of a connecting rod 275, the lower end of said rod being pivoted at 277 to the slide 207.

In operation of the machine, the smoothers 255, 257 are swung out of the way while the counter 300 is placed upon the strap 201, the correct placing of the counter being facilitated by marks (not shown) upon the strap. The smoothers are then swung back into the position shown in which they rest upon the counter. The operator now uses one hand to press down both of the handles 267, 269 of the smoothers more or less, as may be desired, while with the other hand he pulls down the lever 209 to cause the counter and with it the strap to be bent about the form and carried down between the presser rolls 205, 207. Pushing the form down between these rolls causes the counter to be wrapped about the rear portion of the vamp 100 and progressively subjected to rolling pressure; and any tendency of the counter to become wrinkled is counteracted by the action of the smoothers, since the opposite ends of the counter are drawn beneath them in such manner that the ends of the counter are paid out to the form and to the action of the presser rolls under tension.

*The tape mounting machine*

Figure 13:
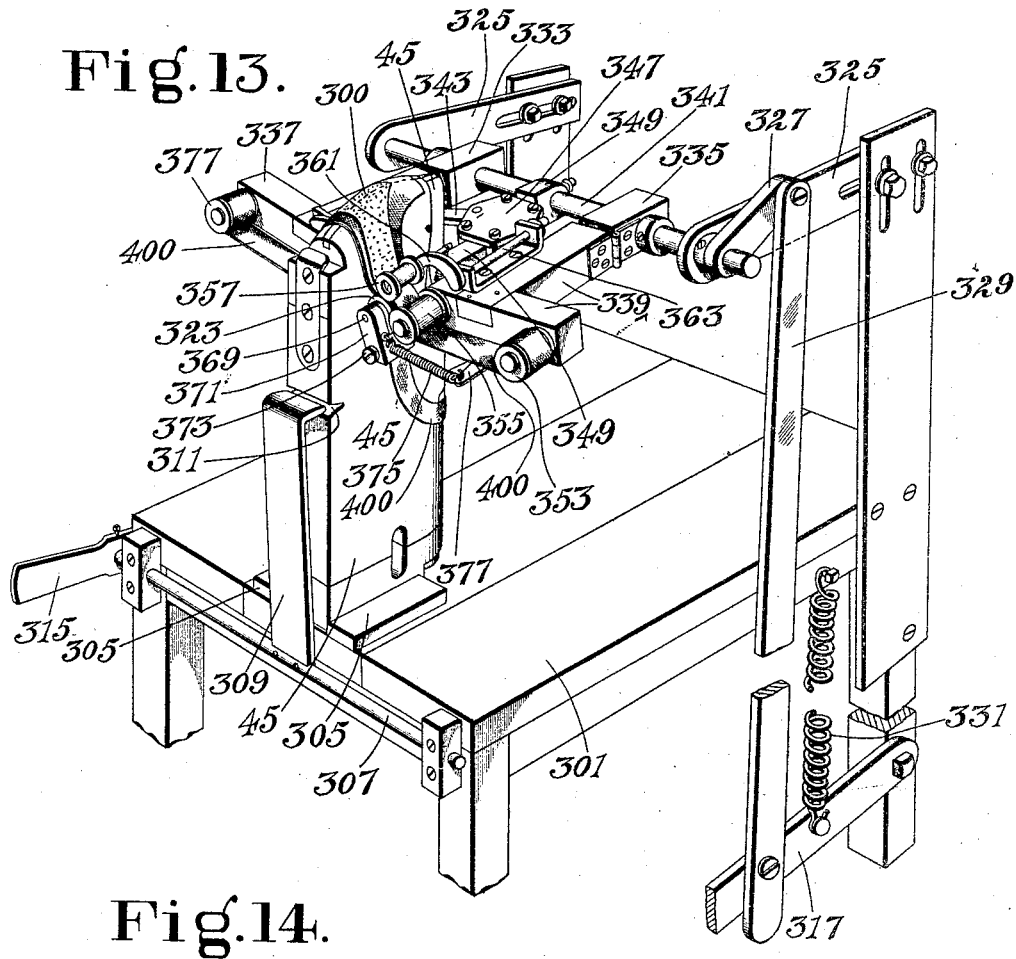
Fig. 13 is a perspective similar to Fig. 10 but showing the tape in process of being mounted upon the form.
Figure 14:
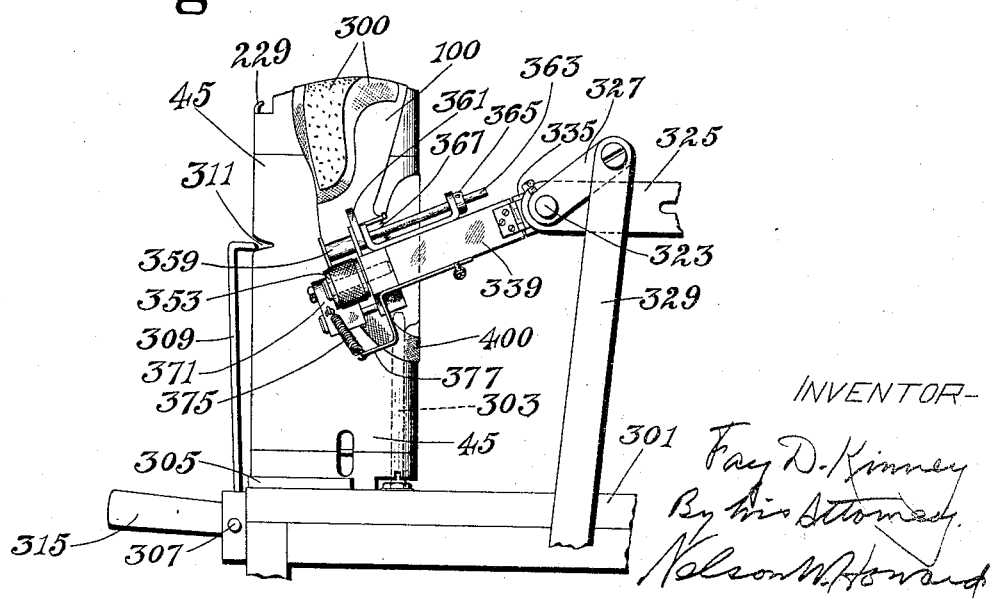
Fig. 14 is a side elevation of a portion of the tape mounting machine with the parts in substantially the same positions as in Fig. 13.

This machine is shown in Figs. 10, 13 and 14. By its use a tape reinforcement, consisting of two pieces of tape, is laid along the lower margin of the vamp and its associated parts beginning at the toe end of the vamp, one piece of tape extending along one side and the other along the other side until they overlap respectively the forward ends of the counter. The form 45 is held stationary; and two heads, which carry respectively the two pieces of tape, are swung from the position shown in Fig. 10 to that shown in Fig. 13, in order to law the two-part tape reinforcement in place.

The table 301 of the machine is provided with an upright pin 303 (Fig. 10), adapted to enter the socket 47 in the form, and with two spaced guides 305 between which the lower end of the form is received. Fast to a rock shaft 307, which is rotatably mounted in bearings carried by the table, is the lower end of a latch 309 which is adapted to enter a suitably shaped notch 311 cut in the flat bottom-edge of the form. This latch is normally held in the operative position shown by a tension spring 313 which is fast at one end to the table and at the other to one end of a handle 315, said handle being fast to the rock shaft 307. When it is desired to place the form 45 in the machine, the handle is depressed, then the form is placed as shown with its socket 47 fitted over the pin 303 and the lower end of the form received between the guides 305, and finally the handle is released to permit the latch 309 to engage the notch 311.

The operator now depresses a treadle 317 to cause two tape applying rolls, one of which is shown at 321 (Fig. 10) and the other at 323 (Fig. 13), to travel along opposite sides of the form so as to lay the two pieces of the tape reinforcement 400. The rolls are carried respectively by two similar heads which are both mounted indirectly upon a rock-shaft 323. This rock-shaft is rotatably mounted in brackets 325 bolted to the frame of the machine and has fast to one end a crank 327 to the upper end of which is pivoted the upper end of a connecting rod 329, the lower end of said rod being pivoted to the treadle 317. A tension spring 331, connected at one end to the frame of the machine and at the other to the treadle, normally holds the parts in the positions shown in Fig. 10 with the connecting rod 329 in contact with the rock-shaft 323 which thus serves as a stop. Fast to the rock-shaft 323 are two blocks 333, 335; and hinged to these blocks respectively are two heads 337, 339 of inverted T-shape which are urged toward each other at all times by a tension spring 341, said spring being fastened at its opposite ends to said heads. Pivoted respectively to the heads are the outer ends of toggle levers 343, 345, the inner ends of said levers being pivoted to a block 347 which is vertically slidable upon a flat bar 349, the head of said bar being fastened to the rock-shaft 323. Fast to the lower end of the bar is a stop for the block in the form of a collar 351.

When the treadle 317 is depressed to rock the two heads 337, 339 upwardly, as shown in Figs. 13 and 14, the heads are swung apart about their hinges by reason of the fact that the tape applying rolls 321, 323 are spread apart when they ride up the opposite sides of the form 45. The rolls are still pressing against the form, due to the action of the spring 341, when the tape laying has been completed and the tapes severed by hand. If now the treadle were released, the rolls would roll back down over the tapes which had just been laid; or, if the form were removed, it would have to be pulled from between the rolls. In order to move the rolls apart and to hold them apart at the end of the tape laying operation, the operator pushes the block 347 down upon the bar 349 until the block contacts with the stop 351. This straightens the toggle levers 343, 345 so as to move the tape applying rolls away from the sides of the form and hold them in that position, the block 347 being then past the dead center of the toggle levers. The treadle is now released to permit the heads 337, 339, and with them the tape applying rolls, to swing back into initial position; and the form 45 is removed from the machine and replaced by another one. Before depressing the treadle again, the operator pushes the toggle block 347 up into contact with the head of the bar 349 once more so as to permit the heads 337, 339 to be swung about their hinges into their normal initial positions, as shown in Fig. 10.

The tapes 400, a certain length of each of which is applied along each side of the form 45, are carried respectively by the heads 337, 339 as has been explained; and since these tapes are mounted in substantially the same manner, the mounting of only one of them will be described in detail. Referring now more particularly to Figs. 10 and 13, the right-hand tape 400 extends from a reel 353 over a guide roll 355 and then between a flanged guide roll 357 and the tape applying roll 323, all of these rolls, as well as the reel, being rotatable upon spindles carried directly or indirectly by the head 339. In Fig. 10, the applying roll 323 is obscured by the rolls 355 and 357, but the free end of the right-hand tape 400 can be seen just to the left of the flanged roll 357. The flanged roll 357 is rotatable upon a spindle which projects downwardly from one end of a curved arm 361, at the other end of which is an upwardly projecting spindle 363 rotatably mounted in a bracket which is fast to the head 339, said spindle being held from longitudinal movement by a collar 365 which is fastened to it near its upper end. A tension spring 367, fast at one end to the head 339 and at the other end to a pin in the curved arm 361, acts at all times to swing the roll 357 about the axis of the spindle 363 so as to cause this roll to press the tape against the applying roll 323. This latter roll is rotatable upon a spindle 369 (Fig. 13) carried by a bracket 371, which is itself rotatable about the axis of a screw bolt 373, said screw bolt being carried by the head 339. A tension spring 375 fast at one end to the bracket 371 and at the other to a finger 377 carried by the head, tends at all times to swing the applying roll 323 about the axis of the screw bolt 373 so as to press the tape against the roll 355. By reason of the yielding mountings of the spindles which carry the rolls 323 and 357, these rolls may be swung away from each other and away from the roll 355 when it is desired to thread the free end of the tape between these rolls.

The other tape applying roll 321 (Fig. 10) is mounted upon the head 337 in the same manner in which the tape applying roll 323 is mounted upon the head 339 and has cooperating with it a flanged guide roll 376 corresponding to the guide roll 357. There is also mounted on the under side of the head 337 a roll (not shown) which corresponds to the roll 355 and a reel 377 for the left-hand piece of tape 400.

The parts of the machine are normally in the positions shown in Fig. 10 with the free ends of the two pieces of tape 400 held in the positions shown in that figure. The treadle 317 is depressed to swing the heads 337, 339 upwardly about the axis of the rock-shaft 341. During this swinging movement, the free ends of the tapes are first brought into contact with the toe portion of the vamp 100 (or the toe-piece 200 if that is present) and caused to adhere to said vamp or toe-piece. As the swinging movement continues, the pieces of tape are unwound from their respective reels and progressively laid along the lower margin of the vamp 100 until they slightly overlap the forward ends of the counter 300. The tape is then severed by means of a knife or other suitable implement; the block 347 is pulled down into contact with the stop 351 so as to move the tape applying rolls away from the form, and then the treadle is released to permit the heads 337, 339 to swing down away from the form. The toggle levers 343, 345 are still holding the heads apart. In order to permit them to swing toward each other preparatory to a second tape laying operation, the block 347 is pushed up into the position shown in Fig. 10. The form is now removed and a succeeding one placed in the machine, whereupon the tape laying operation may be repeated.

The lining mounting machine

This machine, which is shown in Figs. 15 to 18 inclusive, operates in a manner somewhat similar to that of the counter mounting machine. The lining 500 (Fig. 15), which has the general shape of a long vamp, is placed upon a support in the form of a rubberized canvas strap 401, the opposite ends of which are fast to and wound in opposite directions about rolls 403, 405. These rolls are made like a window shade or curtain roll, being urged at all times by internal springs (not shown) to rotate in opposite directions as indicated by the small arrows in Fig. 15, so as to hold the strap 401 normally taut while permitting it to be bent. Beneath this strap are located presser rolls 407, 409 which are normally held close together but may be spread apart. The form 45, with the rubber vamp, the toe piece, the counter and the tape reinforcement in place upon it, is mounted upon a vertical slide bar 411 which may be depressed by depressing a treadle 413 fastened to the lower end of the slide bar by bolts 437. When this treadle is depressed, the form 45 is forced down into the position shown in Fig. 16, carrying with it the lining 500 and a portion of the strap 401, the slide bar 411 being temporarily locked in its down position. As the form moves down, it spreads apart and passes between the presser rolls 407, 409 which act through the strap to press the lining into intimate contact with those parts of the upper which are still upon the form. The lining is placed upon the strap in the first place by means of marks, not shown, on the strap in such position that, when the form has moved down as has just been explained, the ends of the lining project beyond the rear end of the form.

In order to bring these ends of the lining together about the rear end of the form, a second treadle 415 is depressed, which causes two wipers 417, 419 to wipe the rear portions of the lining about the rear portion of the form and to press the rear ends of the lining together in the manner best shown in Fig. 17; and, inasmuch as the lining is made of friction fabric, these two ends adhere firmly to each other. The treadle 415 and the slide bar 411 are now released, and the form 45 is permitted to rise again into the position shown in Fig. 15. It is then removed from the machine and the surplus lining at the rear of the form is trimmed off by any suitable means, for example by a machine (not shown) having two cooperating rotary disk cutters 421, as shown in Fig. 18.

A brief description of the construction and mode of operation of the machine having been given above, a detailed description will now follow: The vertical slide or carrier 411 has a flat rear face which abuts against the flat front face of a stationary upright 423. The slide 411 at its upper end is guided by two bars 425 fast to the upright 423 and a block 427 fast to the outer ends of the bars 425. At its lower end the slide is guided by two similar but longer bars 429, 430 and a long block 431. Tension springs 433 connected at their upper ends to the bars 425 and at their lower ends to the slide 411 normally hold the slide in and tend to return it to its uppermost position, upward movement of the slide being limited by stops (not shown) carried by the slide and adapted to contact with the under side of two bars, one of which is shown at 435, said bars being fast to the stationary upright 423. When the treadle 413 is depressed, as shown in Fig. 16, the slide is locked in its lowermost position by a U-shaped latch 439 which snaps over a projection 441 on the slide. The latch is pivoted about the axis of bolts 443 to the bars 429, 430; and is urged at all times to swing toward the slide by springs, one of which is shown at 444, said springs being attached at their forward ends to the latch and at their rear ends respectively to the bars 429, 430. In order to permit the latch to be released when desired so as to permit the slide 411 to return to the position shown in Fig. 15, a handle 445 is bolted to one leg of the latch.

When the treadle 413 is depressed to move the form 45 down into the position shown in Fig. 16, the rubber-covered presser rolls 407, 409 are spread apart. The presser roll 409 is rotatable in the upper ends of arms 447, 449 which are rigidly fastened together near their upper ends by a bar 451. At their lower ends the arms are fast to a rock-shaft 453 which is mounted in upstanding ears of two brackets 455, said brackets being bolted to the bars 429, 430. The other presser roll 407 is carried similarly by arms 457, 459, the lower ends of which are fast to a rock-shaft 461. The strap-holding curtain rolls 403, 405 are mounted respectively in brackets 461, 463 which are respectively rigid with arms 457, 447. A spring 464 holds the rolls together as nearly as a rod 487 will permit, said rod serving as a stop for the arms 447, 449, 457 and 459.

Since the wipers 417, 419, which bring the ends of the lining together, are mounted in substantially the same manner for equal movement in opposite directions, the mounting of only one of these wipers will be described in detail. The wiper 419 (Fig. 15) is fast to a U-shaped frame 465, the legs of which are pivoted about alined vertical screws 467 which are threaded into ears on a U-shaped bracket 469, said bracket being bolted to the outer end of a generally U-shaped carrier-frame 471. A spring 472 normally holds the frame 465 against a stop 474 as shown in Fig. 15. The legs of the carrier-frame 471 are pivoted about the alined axes of bolts 473 which pass through ears of a bracket 475 fast to the upper end of the swinging arm 449 by which the presser roll 409 is carried. The wiper 417 is mounted upon the swinging arm 459, in a manner similar to that in which the wiper 419 has just been described, to be mounted upon the arm 449. The lower leg of the U-shaped frame which corresponds to the U-shaped frame 465 is shown at 477 in Fig. 15. The lower leg of the U-shaped bracket which corresponds to the bracket 469 is shown at 479. In order to maintain the wipers normally apart, as shown in Fig. 15, and to bring them together when desired, as shown in Fig. 16, the lower leg of the frame 471 by which the wiper 419 is indirectly carried has pivoted to it at 481 the outer end of a toggle lever 483, the inner end of which is pivoted to a block 485 which is fast to the rod 487. The lower leg of the frame which corresponds to the frame 471 and carries indirectly the wiper 417 has pivoted to it the outer end of another toggle lever 489, the inner end of which is pivoted to the same block 485. The rod 487 is slidable in stationary uprights 486, 488, and when this rod occupies its rearward or inner position (Fig. 15) the wipers 417, 419 are spaced apart. If now, the rod is pushed forward into the position shown in Fig. 16, the wipers will be moved toward each other. In so moving, they contact with the form near the rear end thereof and swing somewhat about their vertical pivots with a wiping action until they bring the ends of the lining together as shown in Fig. 17. In order to move the rod 487, forward and back so as to actuate the wipers, the inner end of the rod is received between the arms of an upright yoke 491 (Fig. 16), being connected with said yoke by screws one of which is shown at 493, which pass through slots, one of which is shown at 495, in the arms of the yoke and are threaded into the rod. The yoke is fast to a frame 497 pivoted to the bars 429, 430 at 499; and a U-shaped extension of this frame forms the treadle 415. The yoke 491 and the treadle 415 are normally held by a tension spring 501 in position to maintain the rod 487 in the position shown in Fig. 15.

The form 45 is detachably held in place by a pin 503 on the slide 411 which enters the socket in the form and by plates 505 fast to the slide 411 which extend one on each side of the form. A roll 507 carried by the plates 505 facilitates the guiding of the form into place and acts to an extent to take the upward thrust which results when the form is pushed down into the position shown in Fig. 16.

In order to smooth out the lining 500 while it is being applied to the form, two retarders or smoothers 509, 511 in the form of presser plates are provided. The smoother 509 which has a handle 515 is pivoted about a rod 513 carried by the bracket 461. The smoother 511 which has a handle 519 is pivoted about a rod 517 carried by the bracket 463.

In the operation of the machine, the smoothers 509, 511 are swung up out of the way while the lining 500 is placed in correct position upon the strap 401. The smoothers are then swung back into operative position in which they rest upon the lining. The operator depresses the treadle 413 to cause the form to be thrust down between the presser rolls; and during this downward movement, he exerts more or less pressure, as may be desired, upon the handles of the smoothers. Forcing the form down between the presser rolls causes the lining to be wrapped about the form with the ends of the lining projecting beyond the rear end of the form. At the end of the downward movement of the form the slide 411 which carries the form is locked in its lowermost position, to hold the form in this position, by means of the latch 439. The treadle 415 is now depressed to cause the wipers 417, 419 to draw the rear portions of the lining about the rear portion of the form and to bring their ends together in the manner shown in Fig. 17. These wipers first press the lining against the form at a short distance from the rear end of said form and then swing about their upright pivots into the position shown in Fig. 17. Thus they act first to wipe the rear portions of the lining about the rear end of the form and then to bring the ends of the lining together. The treadle 415 is released, the handle 445 is manipulated to release the carrier slide 411, and the parts of the machine then return to the positions shown in Fig. 15. The form with the lining upon it is now removed; and the double thickness of lining which projects at the rear end of the form is trimmed off, for example, by cutters such as the cutters 421 shown in Fig. 18.

The closed upper, which is formed by assembling its component parts in the manner which has been described above, is wrong side out upon the form. It is necessary, of course, to remove it from the form and turn it right side out; and conveniently this removal and turning may be accomplished in a single operation by grasping the end of the upper and peeling it from the form.

As has been explained, the vamp is applied directly to the form, the toe-piece and the counter are applied to the vamp, the tape reinforcement is applied partly to all three of the previously mentioned parts, and the lining is applied partly to all four of the parts mentioned above. Inasmuch, however, as the form 45 functions in exactly the same manner, so far as the various operations are concerned, whether or not it has one or more parts assembled upon it, the term "form" will be used to indicate a form having some or all of such parts in place upon it as well as the bare form.

Although the method has been set forth by way of illustration as used in assembling the parts of an upper in succession upon a form of a certain shape so that rolling pressure may be conveniently applied simultaneously on both sides of the form, it should be understood that the invention is not limited in the scope of its application to the assembling of the parts one by one upon the form.

Having thus described my invention, what I claim as new and desire to secure by Letters Patent of the United States is:

1. The method of manufacturing a shoe containing rubber which comprises assembling in succession parts of the upper upon a form the surfaces of the sides of which are cylindrical, removing the assembled parts from the form, placing them upon a last and completing the manufacture of the shoe.

2. The method of manufacturing a shoe containing rubber which comprises assembling in succession parts of the upper wrong side out upon a form the surfaces of the sides of which are cylindrical, removing the assembled parts from the form, turning the assembled parts right side out, placing them upon a last and completing the manufacture.

3. The method of manufacturing a shoe containing rubber which comprises assembling parts of the upper upon a form having substantially flat sides, subjecting them to rolling pressure simultaneously on both sides of the form, removing the assembled parts from the form, placing them upon a last and completing the manufacture of the shoe.

4. The method of manufacturing a shoe containing rubber which comprises assembling parts of the upper wrong side out upon a form having substantially flat sides, subjecting them to rolling pressure simultaneously on both sides of the form, removing the assembled parts from the form, turning the assembled parts right side out, placing them upon a last and completing the manufacture of the shoe.

5. The method of manufacturing a shoe containing rubber which comprises assembling in succession parts of the upper upon a form the surfaces of the sides of which are cylindrical, pressing the parts separately into place, by pressure applied simultaneously to both sides of the form, removing the assembled parts from the form, placing them upon a last and completing the manufacture of the shoe.

6. The method of manufacturing a shoe containing rubber which comprises assembling in succession parts of the upper wrong side out upon a form the surfaces of the sides of which are cylindrical, pressing the parts separately into place, removing the assembled parts from the form, turning the assembled parts right side out, placing them upon a last and completing the manufacture of the shoe.

7. The method of manufacturing a rubber overshoe which comprises placing a rubber vamp upon a form having sides the surfaces of which are cylindrical, placing a counter upon the vamp, placing a lining upon the vamp and counter, subjecting the assembled parts to rolling pressure simultaneously upon both sides of the form, removing the assembled parts from the form, placing them upon a last and completing the manufacture of the shoe.

8. The method of making a rubber overshoe which comprises placing an unvulcanized rubber vamp upon a substantially flat support, placing upon the blank a form having substantially flat sides in such manner that substantially half of the blank will stick to the form, turning the form to bring its other side into contact with the other half of the blank, wrapping the ends of the legs of the vamp about one end of the form, and completing the manufacture of the overshoe.

9. The method of making a rubber overshoe which comprises supporting a rubber vamp, placing a form the surfaces of the sides of which are cylindrical with one of its sides upon one longitudinal half of the vamp and with one leg of the vamp projecting beyond the rear end of the form, wrapping the end of this leg about the rear end of the form, turning the form to bring the remaining portion of the vamp, except the end of the other leg, into contact with the other side of the form, and wrapping the end of said other leg about the rear end of the form.

10. The method of making a rubber overshoe which comprises supporting a rubber vamp, placing a form the surfaces of the sides of which are cylindrical with one of its sides upon one longitudinal half of the vamp and with one leg of the vamp projecting beyond the rear end of the form, wrapping the end of this leg about the rear end of the form, turning the form to bring the remaining portion of the vamp, except the end of the other leg, into contact with the other side of the form, wrapping the end of said other leg about the rear end of the form, applying a counter and a lining to the vamp, subjecting the parts to rolling pressure applied simultaneously to both sides of the form, removing the assembled parts from the form, turning them vamp side out, and completing the manufacture of the shoe.

11. The method of manufacturing a shoe containing rubber which comprises assembling in succession parts of the upper upon a form the surfaces of the sides of which are cylindrical, subjecting the parts to rolling pressure applied simultaneously to both sides of the form, removing the assembled parts from the form, placing them upon a last and completing the manufacture of the shoe.

12. The method of manufacturing a shoe containing rubber which comprises assembling in succession parts of the upper wrong side out upon a form the surfaces of the sides of which are cylindrical, subjecting the parts to rolling pressure applied simultaneously to both sides of the form, removing the assembled parts from the form, turning the assembled parts right side out, placing them upon a last and completing the manufacture of the shoe.

13. The method of manufacturing a shoe containing rubber which comprises assembling in succession parts of the upper wrong side out upon a form the surfaces of the sides of which are cylindrical, pressing the parts into place by pressure applied simultaneously to both sides of the form, removing the assembled parts from the form, turning the assembled parts right side out, placing them upon a last and completing the manufacture of the shoe.

14. The method of making a rubber overshoe which comprises supporting a rubber vamp, placing a form the surfaces of the sides of which are cylindrical with one of its sides upon one longitudinal half of the vamp and with one leg of the vamp projecting beyond the rear end of the form, wrapping the end of this leg about the rear end of the form, trimming the end of this leg, turning the form to bring the remaining portion of the vamp, except the end of the other leg, into contact with the other side of the form, wrapping the end of said other leg about the rear end of the form, and trimming the end of the last-named leg.

15. The method of manufacturing a shoe containing rubber which comprises mounting parts of the upper upon a form the surfaces of the sides of which are cylindrical, removing the parts from the form, placing them upon a last, and completing the manufacture of the shoe.

16. The method of manufacturing a shoe containing rubber which comprises mounting parts of the upper upon a form the surfaces of the sides of which are cylindrical, subjecting them to rolling pressure applied simultaneously on both sides of the form, removing the parts from the form, placing them upon a last, and completing the manufacture of the shoe.

In testimony whereof I have signed my name to this specification.

FAY D. KINNEY.